United States Patent [19]
Vincent, II et al.

[11] Patent Number: 5,774,421
[45] Date of Patent: Jun. 30, 1998

[54] UNDERWATER MEASUREMENT DEVICE

[75] Inventors: Harold T. Vincent, II, North Kingstown; Robert A. Connerney, Middletown, both of R.I.

[73] Assignee: The United States of America as represented by the Secretary of the Navy, Washington, D.C.

[21] Appl. No.: 912,971

[22] Filed: Aug. 4, 1997

[51] Int. Cl.[6] .................................................. H04B 11/00
[52] U.S. Cl. ........................................................... 367/131
[58] Field of Search .................................... 367/131, 133, 367/4; 441/26, 33

[56] References Cited

U.S. PATENT DOCUMENTS 2,341,923  2/1944  Kotelev et al. .......................... 114/234
3,906,564  9/1975  Thompson et al. ....................... 441/26
4,692,906  9/1987  Neeley ..................................... 367/133

*Primary Examiner*—Daniel T. Pihulic
*Attorney, Agent, or Firm*—Michael J. McGowan; Robert W. Gauthier; Prithvi C. Lall

[57] ABSTRACT

An underwater measurement device includes a housing for disposition on a sea bed surface, an opening defined by the housing, a buoy for disposition in the opening and buoyant so as to be floatable out of the opening, a cable interconnecting the housing and the buoy, and a winch in the buoy to pay out and take in the cable to permit the buoy to rise toward the sea surface and be drawn into the housing opening. A sensor is fixed to the buoy. Disposed in the device are communication circuitry for relaying to a remote station signals detected by the sensor, and operative circuitry for receiving instructions from the remote station and in response thereto operating the winch and the sensor.

15 Claims, 4 Drawing Sheets

UNDERWATER MEASUREMENT DEVICE

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

(1) Field of the Invention

The invention relates to measurement devices, and is directed more particularly to a measurement device for disposition on the bottom of a sea bed underlying shallow water and for providing an indication as to the presence of oceanographic characteristics and/or acoustic signals in the water.

(2) Description of the Prior Art

Sensors for the measurement and detection of oceanographic and/or acoustic signals are generally known and in use. Oceanographic sensors measure physical characteristics, such as depth, currents, and the like, chemical characteristics, such as the presence of chlorophyll and other substances and elements, and biological characteristics, such as the presence of selected organisms. Acoustic sensors are used to determine the level of noise generally and, more specifically, the presence of a particular noise-generating body. In the area of national defense, acoustic sensors are used to alert a monitoring station as to the presence of a marine vessel or machine, such as a submarine, torpedo, mine, other underwater vehicle or device, or the like. Such acoustic sensing devices usually include an array of hydrophones disposed in an elongated flexible envelope, similar to a hose.

It is known to provide a mooring housing for disposition oil a sea bed, and a buoy connected to the mooring housing by a cable, the buoy being floatable to the surface of the water overlying the sea bed. In U.S. Pat. No. 3,628,205, issued Dec. 21, 1971, there is disclosed such an assembly wherein a winch in the buoy is adapted to alternately pay out and take in cable so that the buoy moves upwardly and downwardly in response to clock means in the buoy. Other arrangements are shown in U.S. Pat. No. 3,772,639, issued Nov. 13, 1973, and including a winch in a buoy for paying out a cable to a float; U.S. Pat. No. 4,189,786, issued Feb. 19, 1980, and including a winch containing a line connected to a buoy; U.S. Pat. No. 4,216,535, issued Aug. 5, 1980, and U.S. Pat. No. 4,358,834, issued Nov. 9, 1982.

In the '205 assembly, the weight of the mooring housing serves to anchor the buoy. In the '639 assembly, the weighted mooring unit serves as an anchor, and also discharges an auxiliary anchor. The '786 and '535 assemblies are each moored by a capsule resting on the sea bed. In the '834 assembly, a mooring capsule includes a solid metal anchoring section which causes the capsule to engage the sea bed end-first, such that the anchoring section enters the sea bed and anchors buoys floating thereabove.

If the cable between the mooring means and the buoy or float means is cut, as by fishing gear, the effectiveness of the assemblies shown in the above noted patents is essentially destroyed. Substantially the entire assembly, less the mooring housing, must be replaced.

The assemblies shown in the above patents are discrete units which send signals by radio means. In the '786 system, there are several assemblies which are connected together by wires so that: information can be sent from one assembly to another, but the eventual dispatch of the information to a remote location is done by radio.

Despite the advances indicated in the above referred-to patents, there remains a need for an underwater measurement device wherein the flotation buoy is adapted to be moved generally vertically, to and from the surface, in a selective manner. There is further a need for a device which embeds itself in the sea bed floor to securely anchor the device in a desired location. There is still further a need for such a device as is resistant to damage from fishing gear, but which, if damaged, is relatively easily returned to operating condition. There is a still further need for such a device as is hard-wired to a remote station, and therefore is adapted to receive instructions, and send reports to, the remote station.

SUMMARY OF THE INVENTION

It is, therefore, an object of the invention to provide an underwater measurement device including a buoy portion selectively moveable in a vertical water column upwardly from, and downwardly towards, a mooring housing portion. A further object of the invention is to provide such a device which actively embeds itself in the sea bed floor.

A further object of the invention is to provide such a device as is resistant to damage from fishing gear and, if damaged, is adapted for relatively easy return to operation. A still further object of the invention is to provide such a device as is hard-wired to a remote station, and is adapted to receive instructions from, and send reports to, the remote station.

With the above and other objects in view, as will hereinafter appear, a feature of the present invention is the provision of an underwater measurement device comprising a housing for disposition on a sea bed surface, a central opening defined by the housing and extending through the housing, a rigid tube fixed in the opening, a buoy sized and configured for disposition in the tube and buoyant so as to be floatable out of the tube and towards the sea surface, and a cable interconnecting the housing and the buoy. A winch is mounted in the buoy and is adapted to pay out and take in the cable to permit the buoy to rise toward the sea surface and to be drawn into the tube. The device further comprises a sensor fixed to the buoy, communication means in the device for relaying to a remote station signals detected by the sensor, and operative means in the device for receiving instructions from the remote station and in response thereto operating the winch and the sensor.

In accordance with a further feature of the invention the device described immediately above is provided with a rigid projection depending from the housing, and nozzle means mounted proximate the projection for directing a fluid jet into the sea bed during positioning of the device thereon, to provide a recess therein for receiving the device.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the several views of the drawings and wherein.

DESCRIPTION OF THE PREFERRED EMBODIMENTS

Figure 1:
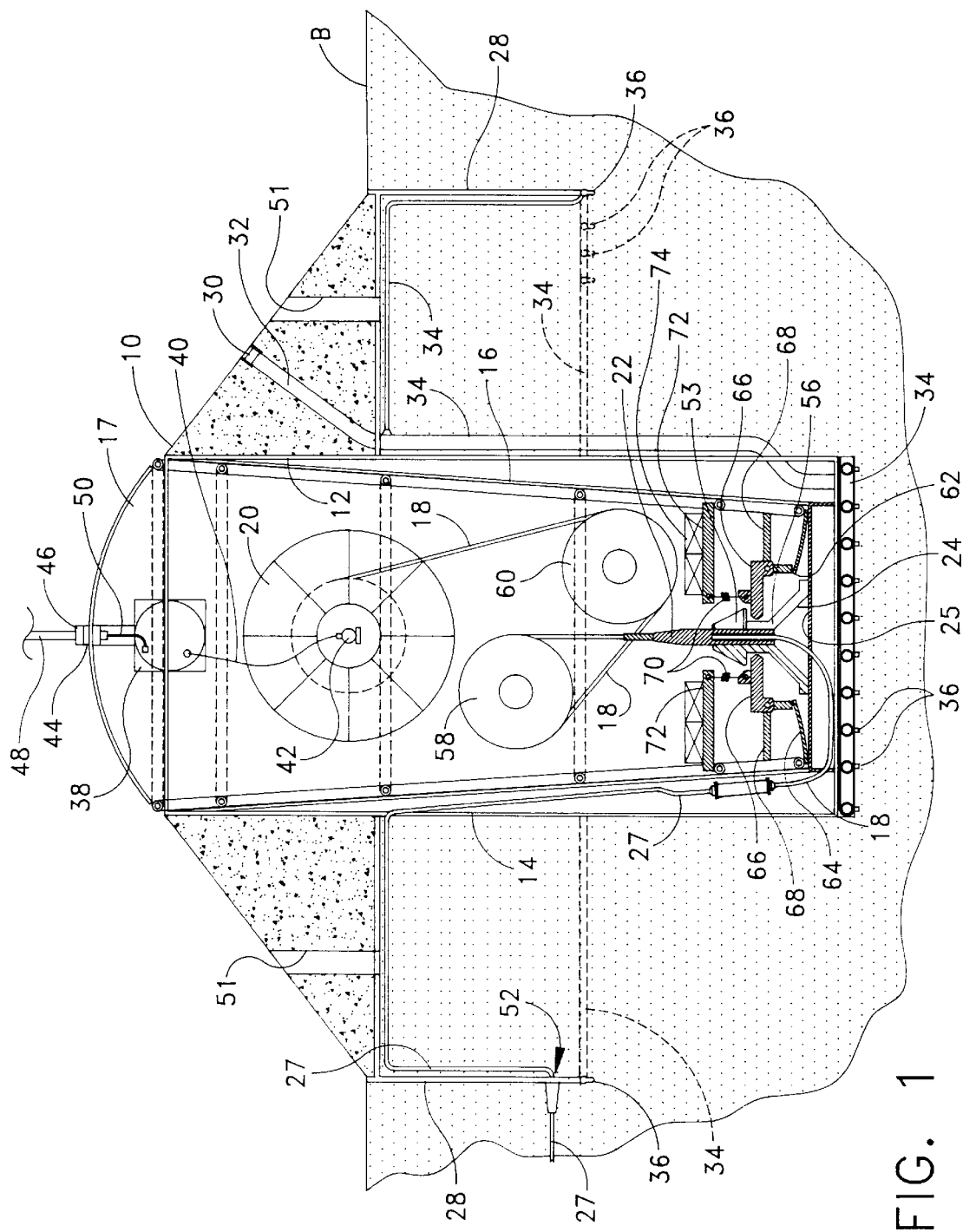
FIG. 1 is a diagrammatic partly sectional, partly side elevational view of one form of sensor device illustrative of an embodiment of the invention.
Figure 2:
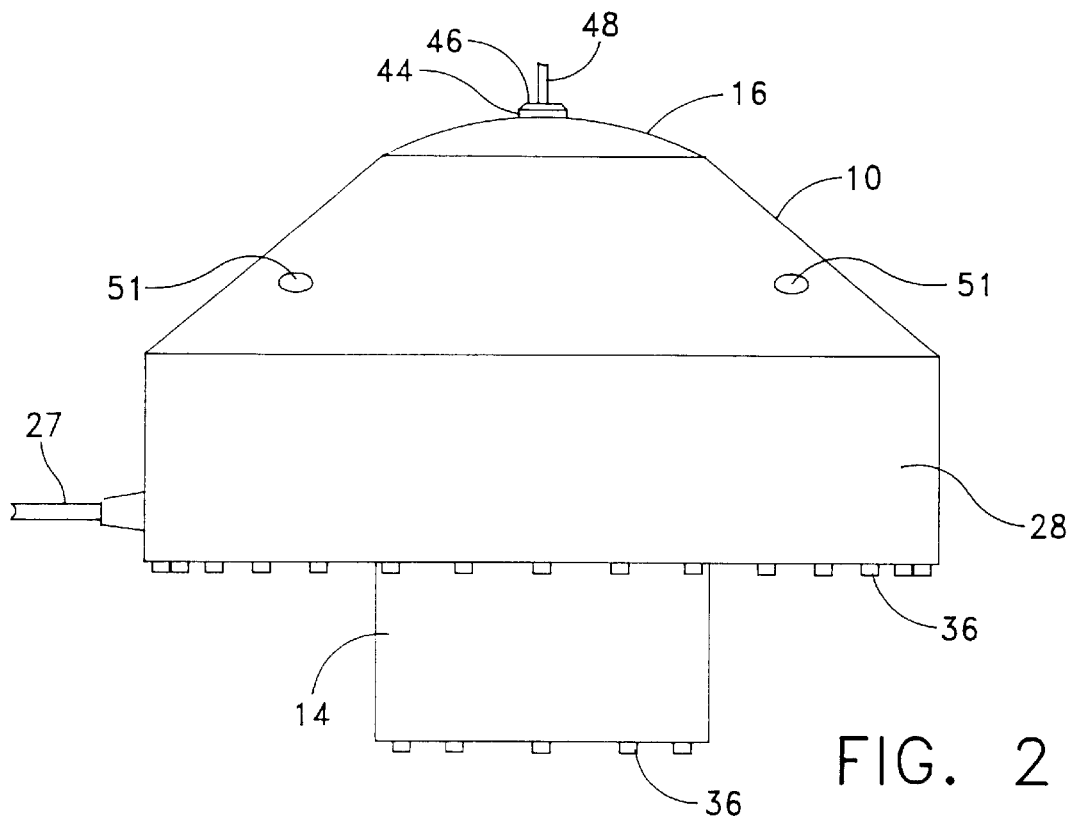
FIG. 2 is a side elevational view thereof.
Figure 3:
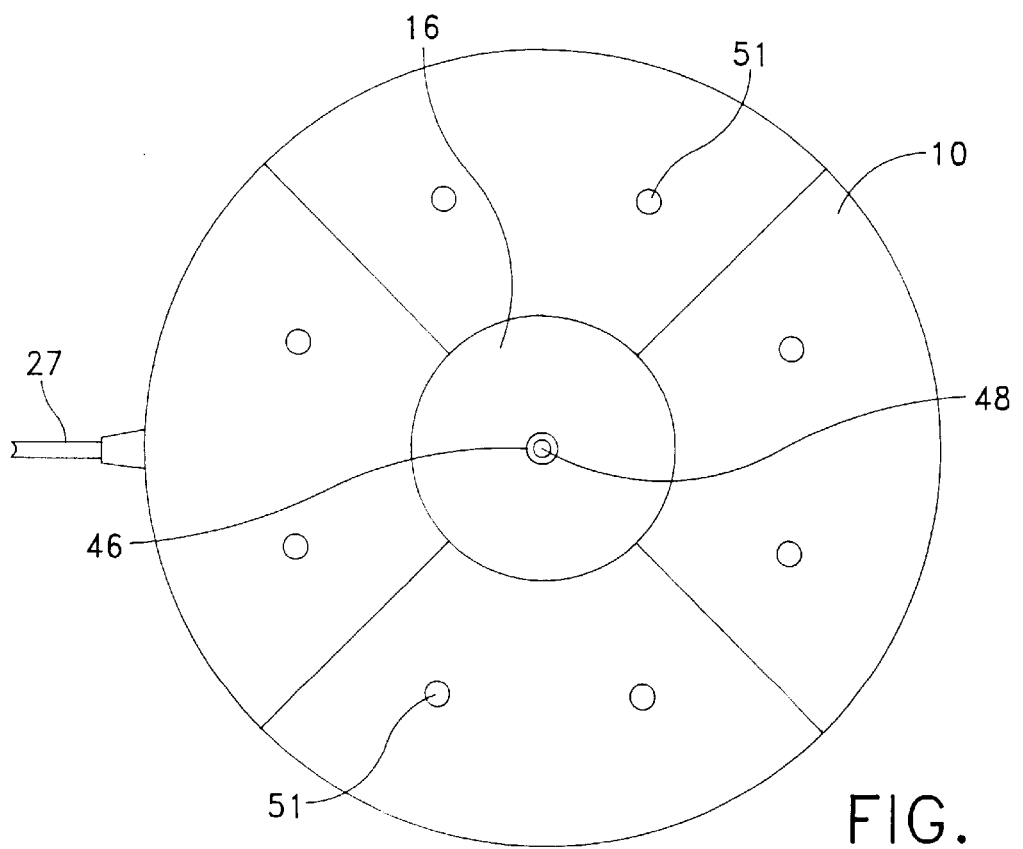
FIG. 3 is a top plan view thereof.
Figure 4:
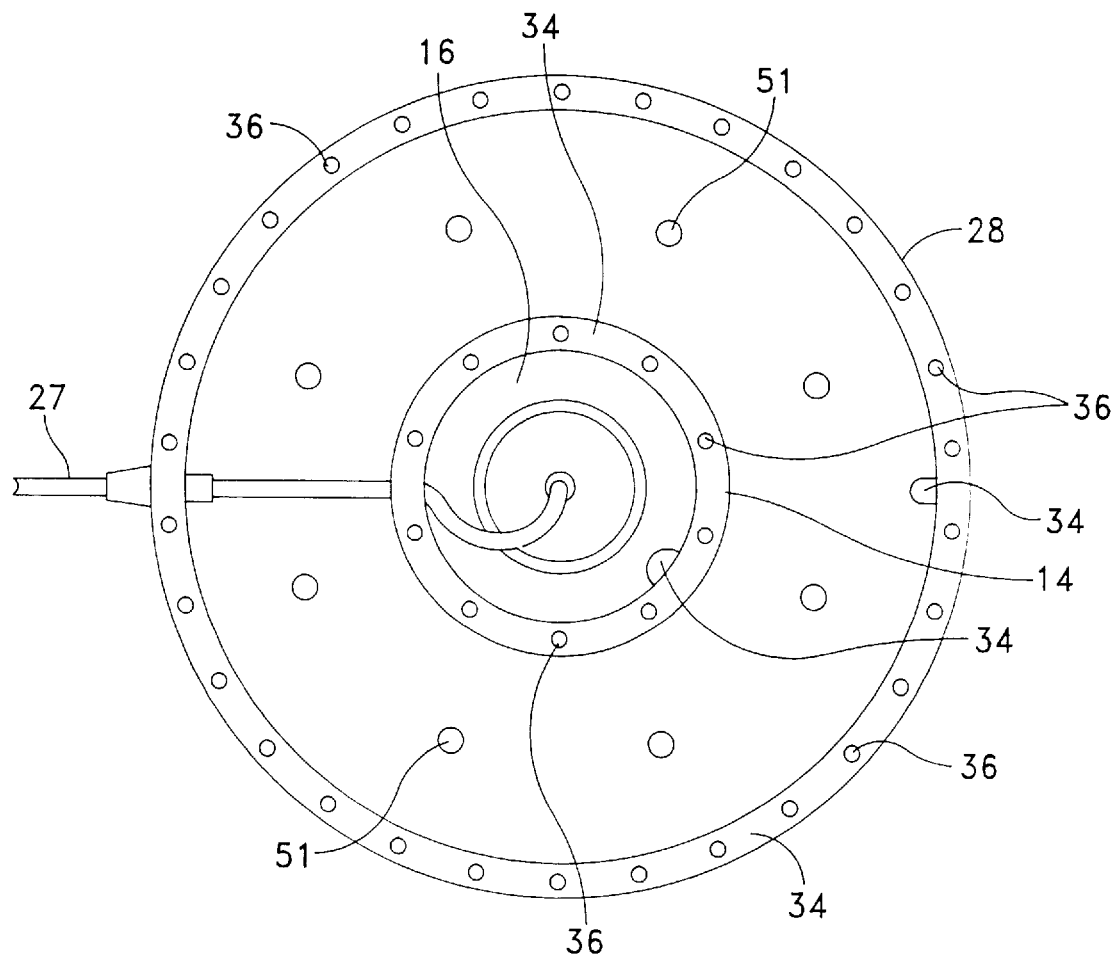
FIG. 4 is a bottom plan view thereof.

Referring to the drawings, it will be seen that the illustrative device includes a housing 10 for disposition on a sea bed surface B. The housing 10 defines an opening 12 extending centrally through housing 10. A rigid cylindrically-shaped tube 14 is disposed in opening 12 and extends downwardly therefrom. A buoy 16 is sized and configured for disposition in tube 14. The buoy 16 is provided with a flotation section 17 and is floatable, and therefore adapted to rise, from tube 14 to the surface of water overlying the sea bed B when not constrained to the tube.

The housing 10 preferably is formed of a cementitious material, such as concrete, but may be formed of metal or plastic. The tube 14 preferably is formed of metal, such as steel, but may be of plastic or a composite material.

An electrical-optical cable 18 is wound on a winch 20 mounted in buoy 16 and extends therefrom through a termination sleeve 22 mounted in a grommet 24 fixed to a bottom 25 of tube 14. The cable 18 is spliced to an electrical-optical cable 27 which extends from the device to a remote monitoring station (not shown) on shore.

A rigid projection depends from the underside of housing 10 and preferably is in the form of a circular skirt 28. The device is provided with a fluid jet system including an inlet 30 for connection to a hose (not shown) for conducting fluid, such as water or air, a channel 32 through housing 10, conduits 34 within skirt 28 and tube 14, and a series of jetting nozzles 36 depending from conduits 34 and extending along hypothetical extensions of skirt 28 and tube 14, so as to direct jets of high pressure fluid to areas beneath skirt 28 and tube 14.

In addition to winch 20, there is mounted in buoy 16 an electrical-optical instrumentation housing 38 which is connected by an electrical-optical short cable 40 to winch 20. The winch 20 is provided with an electrical and fiber optic rotary joint 42 to permit optical and electrical signals through the winch 20 across the rotational interface.

Mounted in the upper surface of buoy 16 is an underwater connector 44 for connection to a break-away connector 46 which is fixed to a sensor 48. The sensor 48 may be a selected one of known sensors, including sensors for measuring and/or detecting physical and/or chemical and/or biological parameters of the sea bed and/or water overlying the sea bed. Alternatively, sensor 48 may be of the acoustical type and, more particularly, an acoustical array. In the latter case, sensor 48 shown in FIG. 1 constitutes only an end portion of the array, with the array extending a selected distance, up to hundreds of feet, therefrom, as is known in the art. The sensor 48 is in communication with instrumentation housing 38 by way of an electrical cable 50.

The housing 10 typically is lowered by a crane (not shown) to the sea bed surface B. The buoy 16 may be provided with a ring (not shown), or the like, for receiving a hook suspended from the crane. Prior to lowering of housing 10, a fluid high pressure hose (not shown) will have been attached to fluid inlet 30. Before the device hits bottom, the fluid jet system is actuated to send a high pressure fluid through channel 32, conduits 34, and jetting nozzles 36 to impinge upon sediment beneath tube 14 and skirt 28, or other projection. The jetting nozzles 36 thus blow away sediment, to create a recess for receipt of the skirt. The housing 10 is provided with vents 51 through which water and sediment may flow as skirt 28 descends into the sea bed.

To accommodate the electrical-optical cable 27, which passes through an opening 52 in the skirt 28, a remote operated vehicle (ROV) (not shown) is used to open a trough, usually by a high pressure fluid system similar to the fluid jet system described herein, and to push cable 27 into the trough by use of a mechanical arm. After cable 27 has been buried to a safe distance from housing 10, an underwater plow (not shown) is used to dig a further trough and sweep cable 27 into the trough. The ROV and underwater plow are known and do not form a part of the invention described herein.

Once the device is securely embedded in the sea bed sediment, and electro-optical cable 27 is in communication with the remote station, the remote station signals to instrumentation housing 38 to release buoy 16. The instrumentation housing 38 then instructs winch 20 and a drive wheel 58 to unwind electro-optical cable 18. As cable 18 is unwound, cable 18 which is fixed at one end in sleeve 22 and at the other end to winch 20, is lengthened to permit buoy 16 to rise in response to its own buoyancy. When buoy 16 reaches the water surface, the winch and drive wheel are stopped automatically.

Figure 5:
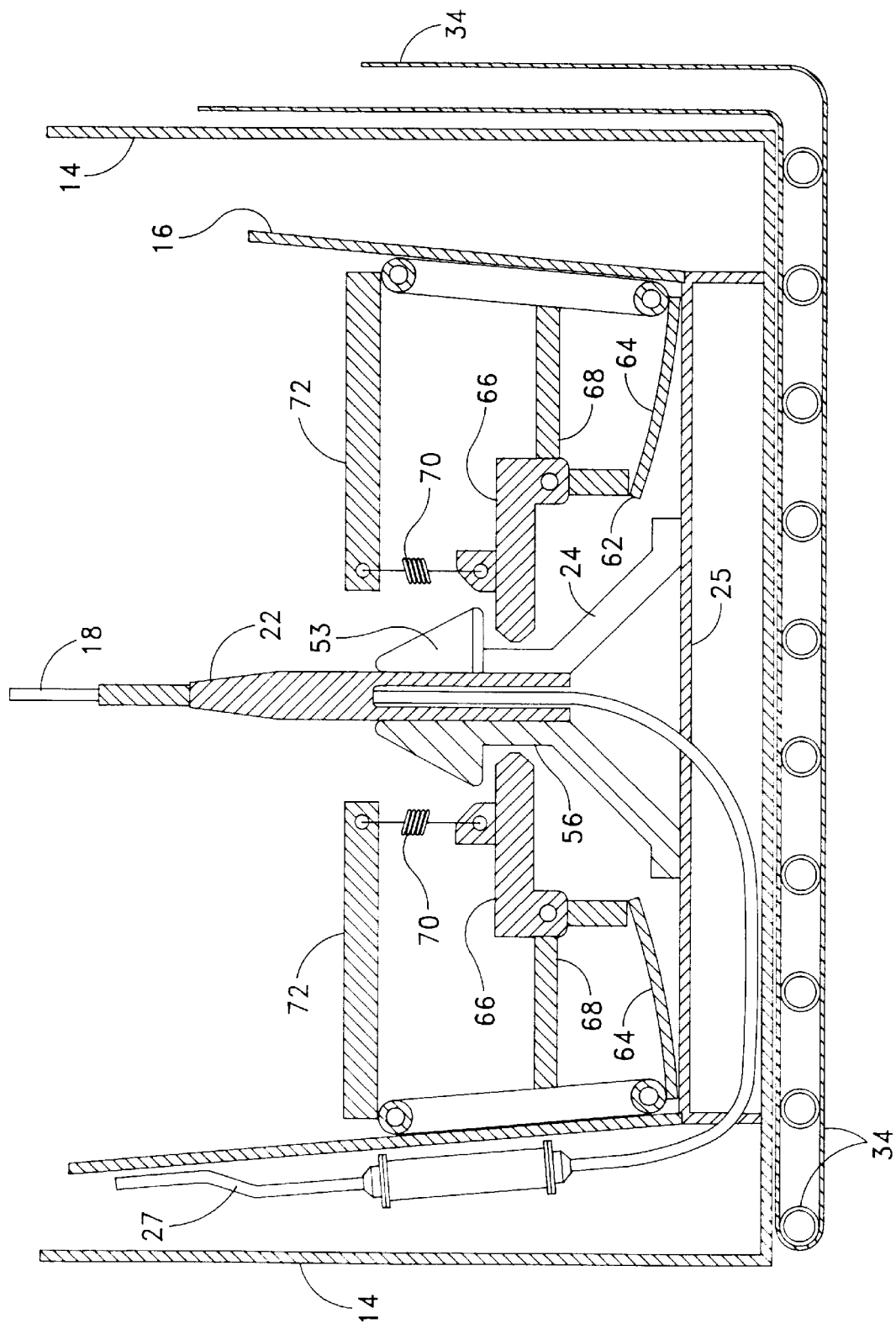
FIG. 5 is an enlarged sectional and partly elevational view of a portion of the device.

With buoy 16 floating on the water surface, personnel in a small boat, or the like, attach a selected sensor 48 with breakaway connector 46 to underwater connector 44. The winch 20 and drive wheel 58 are then signalled to retrieve buoy 16 which is drawn back into tube 14. The grommet 24 fixed to the bottom 25 of tube 14 is of elastomeric material and includes a head portion 53 of a frusto-conical configuration, fixed to the upper end of a neck portion 56. To draw buoy 16 into tube 14, winch 20 winds cable 18 upon itself. Winch 20 and drive wheel 58 are synchronized by motors (not shown) to move cable 18 at equal speeds therearound. An idler pulley 60 may be interposed between, drive wheel 58 and winch 20. As cable 18 is wound on winch 20, a central opening 62 defined by an annular bottom wall 64 of buoy 16 descends downwardly around sleeve 22 and grommet head portion 53. Docking linkages 66 (FIG. 5) pivotally mounted on brackets 68 engage grommet head portion 53 and pivot upwardly, compressing coil springs 70, and riding along the frusto-conical surface of grommet head portion 53. In due course, linkages 66 pass beyond grommet head portion 53 and snap therebeneath, toward grommet neck portion 56 (FIG. 5), to secure buoy 16 in tube 14. When buoy 16 rises, docking linkages 66 are caused to pivot so as to expand coil springs 70 and permit linkages 66 to rise around grommet head portion 53. Springs 70 are suspended from an annular shelf 72 on which are disposed batteries 74 (FIG. 1) for powering winch 20, drive wheel 58, and electrical optical instrumentation in housing 38.

If the sensor is an acoustical array, it typically will extend substantially vertically toward the water surface. oceanographic sensors for physical, chemical or biological readings, typically are much smaller and may extend only a few inches from buoy 16.

Once in place, the sensor device measures and/or detects parameters of the type for which the sensor 48 is appropriate. The measured data is transmitted via electrical-optical cable 27 to the remote station. In use, a measurement system typically includes a selected number of such sensor devices and the monitoring station makes use of a number of reports received from neighboring sensor devices to obtain a more complete picture of changes in the sea environment. When desired, the monitoring station orders paying out or taking in of the buoys 16, and/or the taking of particular recordings by the sensor. The sensor devices 48, instrumentation in housing 38, winch 20, and drive wheel 58 are powered by batteries 74. The device sends and receives signals through cable 27 and does not require radio transmission antennae, and the like, and need not be raised to the surface in order to send or receive a message.

In the event trawling or other fishing gear is dragged across the device, the inclined upper surface of the housing 10 usually directs the gear over the device, typically passing over sensor 48. The upper surface of housing 10 preferably is of a frustum configuration, such as frusto-conical or frusto-pyramidal. When sensor 48 is an array, though the gear encounters the array, the array is flexible and passes beneath the gear and, upon departure of the gear, returns to the substantially vertical posture. If the gear smashes into sensor 48, break-away connector 46 divorces sensor 48 from underwater connector 44. While sensor 48 may be lost, the expensive portion of the device, within buoy 16, is preserved undamaged. To effect a "repair", the buoy is allowed to float to the surface and personnel in a small craft attach another sensor having a break-away connector 46 thereto, whereupon buoy 16 is once again drawn into tube 14.

If it is desired to take a reading at a selected level between the sea bed B and the water surface, as for example a chemical reading at mid-depth, the winch may be remotely operated to pay out cable 18 to allow the buoy to rise half-way, or thereabouts, toward the water surface for the taking of such readings. Upon completion thereof, buoy 16 is again drawn into the tube 14.

There is thus provided a sensor for disposition on a sea bed and in which the detection portion can be selectively moved vertically in the water. There is further provided such a sensor which is adapted to embed itself into the sea bed and requires no additional mooring equipment, such as anchors, and the like. There is still further provided such a sensor as is resistent to damage from fishing gear and which, if damaged, can be easily returned to operative condition. There is still further provided such a sensor as is hard-wired to a remote station and adapted to receive instructions from such station and to send reports to such station. It is to be understood that the present invention is by no means limited to the particular construction herein disclosed and/or shown in the drawings, but also comprises any modifications or equivalents within the scope of the claims.

What is claimed is:

1. An underwater measurement device comprising:

a housing for disposition on a sea bed surface;

an opening defined by said housing and extending through said housing;

a buoy sized and configured for disposition in said opening, and buoyant so as to be floatable out of said opening and toward a sea surface;

docking linkage means automatically operative to lock said buoy in said housing when said buoy is fully drawn into said housing, and for releasing said buoy upon floatation of said buoy upwardly;

a cable interconnecting said housing and said buoy;

a winch in said buoy adapted to pay out and take in said cable to permit said buoy to rise toward the sea surface and be drawn into said opening; and a sensor fixed to said buoy for obtaining measurements.

2. The device in accordance with claim 1 wherein said housing comprises a body of a material selected from a group of materials consisting of cementitious material, metal, plastic, and combinations thereof.

3. The device in accordance with claim 1 further comprising a rigid projection depending from said housing for embedment in the sea bed.

4. The device in accordance with claim 3 wherein said projection comprises a wall.

5. The device in accordance with claim 4 wherein said wall comprises a circular skirt.

6. An underwater measurement device comprising:

a housing for disposition on a sea bed surface;

a rigid projection depending from said housing for embedment in the sea bed;

a nozzle mounted proximate said projection for directing a fluid jet into the sea bed during positioning of said device thereon to provide a recess therein for receiving said device;

an opening defined by said housing and extending through said housing;

a buoy sized and configured for disposition in said opening, and buoyant so as to be floatable out of said opening and toward a sea surface;

a cable interconnecting said housing and said buoy;

a winch in said buoy adapted to pay out and take in said cable to permit said buoy to rise toward the sea surface and be drawn into said opening; and a sensor fixed to said buoy for obtaining measurements.

7. The device in accordance with claim 1 wherein said buoy is provided with a connector for retaining said sensor.

8. An underwater measurement device comprising:

a housing for disposition on a sea bed surface;

an opening defined by said housing and extending through said housing;

a buoy sized and configured for disposition in said opening, and buoyant so as to be floatable out of said opening and toward a sea surface;

a cable interconnecting said housing and said buoy;

a winch in said buoy adapted to pay out and take in said cable to permit said buoy to rise toward the sea surface and be drawn into said opening;

a sensor fixed to said buoy for obtaining measurements;

a connector provided on said buoy for retaining said sensor; and a break-away connector on said sensor connectable to said connector.

9. The device in accordance with claim 8 wherein said sensor comprises an acoustic array.

10. An underwater measurement device comprising:

a housing for disposition on a sea bed surface, and upper surface of said housing being of a frustrum-like configuration;

a rigid projection depending from said housing for embedment in the sea bed;

an opening defined by said housing and extending through said housing;

a buoy sized and configured for disposition in said opening, and buoyant so as to be floatable out of said opening and toward a sea surface;

a cable interconnecting said housing and said buoy;

a winch in said buoy adapted to pay out and take in said cable to permit said buoy to rise toward the sea surface and be drawn into said opening; and a sensor and be drawn into buoy obtaining measurements.

11. The device in accordance with claim 1 further comprising a tube disposed in said opening, said buoy being adapted for disposition in said tube and being floatable out of said tube.

12. The device in accordance with claim 1 further comprising a communication means in said device for relaying to a remote station signals detected by said sensor.

13. The device in accordance with claim 12 further comprising operative means in said device for receiving instructions from the remote station and in response thereto operating said winch and said sensor.

14. The device in accordance with claim 13 wherein said communication means and said means for receiving instructions comprises circuitry disposed in part in said buoy and in part on said housing and extending therefrom.

15. The device in accordance with claim 14 wherein said circuitry is in part electronics circuitry and in part fiber optic circuitry.

* * * * *